United States Patent
Yageta et al.

(10) Patent No.: US 7,604,894 B2
(45) Date of Patent: Oct. 20, 2009

(54) FILM COVERED BATTERY AND STACKED BATTERY ASSEMBLY

(75) Inventors: Hiroshi Yageta, Kawasaki (JP); Makihiro Otohata, Kawasaki (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/873,956

(22) Filed: Oct. 17, 2007

(65) Prior Publication Data
US 2008/0090143 A1 Apr. 17, 2008

Related U.S. Application Data

(63) Continuation of application No. 10/790,207, filed on Mar. 2, 2004, now Pat. No. 7,468,220.

(30) Foreign Application Priority Data

Mar. 3, 2003 (JP) ............................. 2003-055573

(51) Int. Cl.
*H01M 10/34* (2006.01)
*H01M 10/52* (2006.01)
*H01M 2/00* (2006.01)
*H01M 2/02* (2006.01)

(52) U.S. Cl. .................... 429/57; 429/163; 429/176
(58) Field of Classification Search .............. 429/57, 429/163, 176
See application file for complete search history.

(56) References Cited

U.S. PATENT DOCUMENTS

| | | | |
|---|---|---|---|
| 4,092,464 A * | 5/1978 | Dey et al. ................... 429/127 |
| 5,419,982 A | 5/1995 | Tura et al. | |
| 5,916,704 A | 6/1999 | Lewin et al. | |
| 6,713,209 B1 | 3/2004 | Naskali | |
| 6,797,429 B1 | 9/2004 | Komatsu | |

FOREIGN PATENT DOCUMENTS

| | | |
|---|---|---|
| EP | 1 291 934 A2 | 3/2003 |
| JP | 06-111799 A | 4/1994 |
| JP | 10-55792 A | 2/1998 |
| JP | 2000-100404 A | 4/2000 |
| JP | 2000-133216 A | 5/2000 |
| JP | 2001-196035 A | 7/2001 |
| JP | 2001-222986 | 8/2001 |
| JP | 2002-117904 A | 4/2002 |
| KR | 2003-0053547 A | 7/2003 |

* cited by examiner

*Primary Examiner*—Patrick Ryan
*Assistant Examiner*—Julian Mercado
(74) *Attorney, Agent, or Firm*—Sughrue Mion, PLLC (57) ABSTRACT

A film covered battery has a battery element, a positive and a negative lead terminal connected to the battery element, and a casing for sealing the lead terminals and the battery element together with an electrolytic solution, with portions of the lead terminals extending therefrom. The casing has a buffer in at least a portion thereof for accumulating a gas generated within the casing through deformation of the casing. The buffer is formed continuously with a region for accommodating the battery element.

1 Claim, 5 Drawing Sheets

FILM COVERED BATTERY AND STACKED BATTERY ASSEMBLY

This application is a Continuation Application of U.S. application Ser. No. 10/790,207, filed Mar. 2, 2004 and now U.S. Pat. No. 7,468,220, the entire contents of which are hereby incorporated by reference.

BACKGROUND OF THE INVENTION

1. Field of the Invention

The present invention relates to a film covered battery which contains a battery element sealed by a casing made of a film, and to a battery assembly which has a plurality of film covered batteries stacked in the thickness direction of battery elements.

2. Description of the Related Art

Conventionally, film covered batteries have employed a casing made of a thermally sealable film. A known such film covered battery has a battery element wrapped by a laminate film made up of a metal layer and a thermally sealable resin layer laminated thereon, and a positive and a negative lead terminal connected to the battery element and led out from the laminate film, with open edges of the laminate film being thermally fused to hermetically seal (hereinafter simply referred to as "seal" as the case may be) the battery element. This type of film covered battery advantageously facilitates a reduction in thickness, and therefore most of conventional film covered batteries are flat in shape.

As with batteries which employ casings made of other materials, a battery having a casing made of a film is also required to ensure reliability for the sealing in sealed regions to prevent outside air from introducing into the battery, and an electrolytic solution within the battery from leaking. Particularly, the reliability for sealing is important for a battery which includes a nonaqueous electrolytic solution (hereinafter also called the "nonaqueous electrolytic battery"). A defective sealing would cause deterioration of the electrolytic solution due to components of the outside air to significantly degrade the performance of the battery.

It has been often said that in a film covered battery, a portion of fused films from which lead terminals are led out is more susceptible to degraded sealability than the remaining portion, so that a leak path is readily formed for the outside air, and an electrolytic solution readily leaks from this portion unless appropriate measures are taken therefor. Once a leak path is formed for the outside air, the electrolytic solution will deteriorate due to components of the outside air, and water vapor included in the outside air will introduce into the battery, electrolyze on the surfaces of electrodes to generate a large amount of hydrogen, particularly in a nonaqueous battery, causing significant degradation in the performance of the battery. Also, the electrolytic solution, if leaking, would contaminate surroundings of the battery, and would stick to electric circuits around the battery to give rise to malfunctions of the electric circuits.

The degradation in sealability of lead-out paths for lead terminals may be faster or slower depending on how the battery is used and on the state within the battery. For example, if the internal pressure increases with the electrolytic solution remaining near the lead terminal lead-out paths, the pressure of the electrolytic solution is applied to the interface of the fused film, possibly contributing to promoted deterioration in sealability, and to advanced peeling of the fused film.

On the other hand, if the battery is applied with a voltage out of rating, the electrolytic solution will electrolyze to generate gas species which may cause an increased internal pressure of the battery. Further, if the battery is used at high temperatures out of a specified range, the electrolytic solution will also electrolyze to generate materials which can be sources of gas species.

Basically, it is ideal to use the battery within the specified range to avoid the generation of gas. However, it is difficult to completely eliminate any cause of generating a trace of gas within the battery depending on particular applications of the battery, even if the user intends to use the battery within the specified range, due to temporary control errors in a control circuit for the battery, instantaneous generation of a large current, lack of cooling for the battery, and the like, which would cause sudden or temporary generation of high temperatures.

To solve such troubles caused by the gas generated within the battery, film covered batteries have been proposed as illustrated below.

For example, JP-10-55792-A discloses a film covered battery which has a portion of a fused film that has a lower peel strength, such that when the internal pressure anomalously increases due to a gas generated within the battery, the gas is expelled from the portion having a lower peel strength.

JP-2000-133216-A discloses a battery which has an aluminum laminate film in a rectangular shape through draw forming to define a space for accommodating a battery element, thereby minimizing a surplus space.

JP-2000-100404-A discloses a battery pack which receives a battery sealed with a film in a battery room to constrain the battery fitted therein.

JP-6-111799-A discloses a battery which holds a space around electrodes, which make up a battery element, and wraps the battery element with an air-tight sheet made of synthetic resin for sealing the battery element.

As described above, while it is ideal to basically avoid the generation of gas within the battery, even a trace of gas is generated within the battery could accumulate within the battery over a long term of use. The gas thus accumulated within the battery will cause the internal pressure of the battery to increase, a film interface to be applied with a liquid pressure at lead terminal lead-out paths, thereby promoting deteriorated degradation and advanced peeling of a fused film in consequence. Particularly, if exposure of the battery element to the outside air can cause degradation in performance, the degradation in performance will arise, for example, with a nonaqueous battery. The degraded performance can result in a useless battery, and sudden exacerbation of charge/discharge characteristic depending on particular situations.

Reviewing the prior art techniques disclosed in the respective patent documents cited above from the foregoing point of view, the following problems can be pointed out.

In the battery disclosed in JP-10-55792-A, even if exposure of the battery element to the outside air causes degradation in performance, a portion of the fused film having a lower peel strength is operated as a safety valve which is opened to expose the battery element to the outside air. With this method, even a trace of gas generated during use of the battery will accumulate over a long term with an associated increase in the internal pressure. When the internal pressure exceeds a threshold, the portion having a lower peel strength automatically peel off even if the battery is used within a specified range. After the emission of the gas, outside air introduces from an opening formed due to the peeling. A nonaqueous electrolytic battery suffers from significant degradation in performance if outside air including moisture introduces into the battery, and falls into an out-of-service condition as the case may be. If the threshold is set at a low value, the battery will per se end up in an out-of-service condition in a short term.

In the structure of the battery disclosed in JP-6-111799-A, a casing is originally provided with an exhaust port, and a portion of the casing around the exhaust port is brought into close contact by means of oil to prevent an electrolytic solution from leaking from the exhaust port. However, while this structure can be basically applied to a battery such as lead storage battery which is not immediately affected by water vapor introduced thereinto from outside air to experience exacerbation of the battery characteristics, this structure cannot be used for a nonaqueous electrolytic battery because its battery characteristics are affected by water vapor of outside air introduced through the interface with such simple sealing provided by bringing the casing into close contact by means of oil.

On the other hand, it seems that the battery described in JP-2000-133216-A can withstand a relatively high internal pressure even if a gas is generated inside, if appropriate sealing is provided. However, in the battery disclosed in JP-2000-133126-A, the battery element room formed in the casing is matched in shape (size) with the battery element with the intention to minimize the spacing between the battery element and the casing for improving the volume efficiency, and moreover, the casing is thermally fused together near the battery element.

Figure 1A:
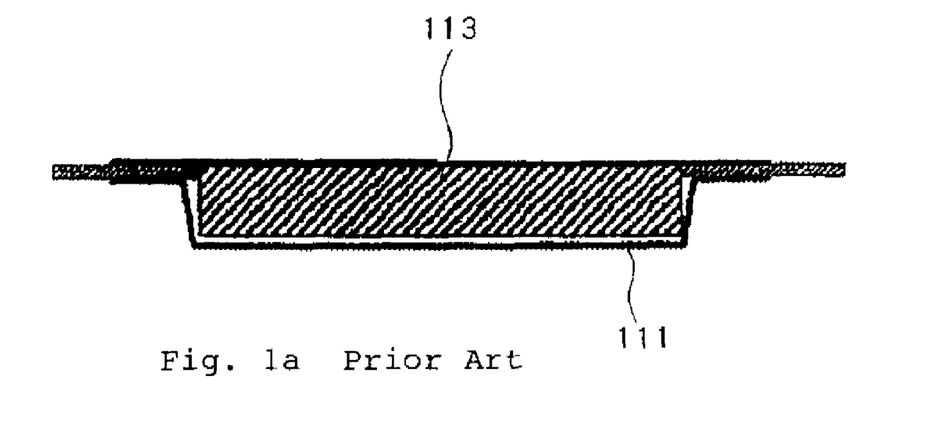
FIGS. 1a and 1b are cross-sectional views for describing a problem which may arise when the internal pressure increases in a conventional film covered battery.
Figure 1B:
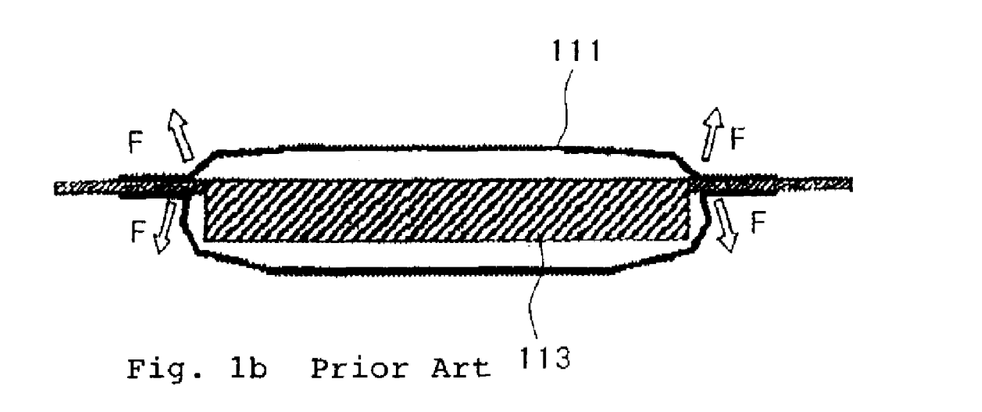

Describing with reference to FIGS. 1a and 1b, casing 111 is substantially identical in shape to battery element 113 before a gas is generated as illustrated in FIG. 1a. However, as a gas is generated, the casing is immediately deformed into a potbelly shape as illustrated in FIG. 1b because the gas cannot be saved up at the maintained atmospheric pressure. Since casing 111 is made of an aluminum laminate film, it hardly draw through elastic deformation, so that if even a trace of gas is continuously generated, the internal pressure will continuously increase. The high internal pressure thus generated will finally provoke strong force F which peels off fused regions of casing 111 as illustrated in FIG. 1b, and the fused regions of casing 111 are eventually opened up to form a leak path. In other words, as this exemplary nonaqueous electrolytic battery is used over a long term, a trace of gas may be generated little by little, in which case the internal pressure readily increases to cause susceptibility to peeling of the fused regions of the casing and a leak due to the gas pressure, possibly causing the battery to fall into an out-of-service condition due to the introduction of outside air, as described above.

As described in JP-2000-100404, when a battery is kinematically constrained by a battery pack, a generated gas cannot be saved up at the maintained atmospheric pressure in the conventional structure. Therefore, if a trace of gas is continuously generated for a long term as mentioned above, the battery pack becomes more susceptible to peeling of a fused film and to a resulting leak due to the gas pressure.

Further, when a plurality of film covered batteries are combined into a battery assembly, the following problems may be envisaged.

In most cases, film covered batteries are flat in shape, so that when the film covered batteries are stacked in the thickness direction thereof to form a battery assembly, associated lead terminals are in close proximity to each other to facilitate electric connections. Also advantageously, a pair of holders may be used to simultaneously pressurize a plurality of unit batteries for maintaining the adherence for electrodes of battery elements. However, when flat film covered batteries are stacked and pressurized, the following problems can arise from a viewpoint of the sealability in regions of a film in which lead terminals are led out. Specifically, with conventional flat film covered batteries, stacked batteries sandwiched in between are difficult to volumetrically inflate, and therefore a generated gas will readily cause the internal pressure to increase. As such, the battery assembly is more susceptible to deterioration in sealability in the lead terminal lead-out paths due to the aforementioned mechanism unless appropriate measures are taken.

As described above, the film covered batteries have been highly required to improve the reliability for the sealing for the lead terminal lead-out paths to prevent the electrolytic solution from leaking. Also, when a plurality of film covered batteries are stacked to form a battery assembly, a disadvantageous influence has acted on the reliability for sealing the lead terminal lead-out paths.

SUMMARY OF THE INVENTION

It is therefore an object of the present invention to provide a film covered battery which limits an increase in internal pressure, even if a gas is generated and accumulated within the battery, to maintain the reliability for sealing over a long term, and a battery assembly formed of a plurality of the film covered batteries which are stacked on one another.

To achieve the above object, a film covered battery according to the present invention includes a battery element having a positive electrode and a negative electrode opposing each other, lead terminals connected to the positive electrode and negative electrode of the battery element, respectively, and a flexible casing for sealing the battery element and the lead terminals together with an electrolytic solution with the lead terminals partially extending from the casing. The film covered battery of the present invention also includes a buffer formed in at least a portion of the casing continuous with a region in which the battery element is accommodated for accumulating a gas generated within the casing through deformation of the casing.

With the buffer provided in at least a portion of the casing continuous with the region for accommodating the battery element in the foregoing manner, a gas generated from the battery element is accumulated in the buffer to limit an increase in the internal pressure of the casing. As a result, since a limited peeling force acts on the casing around bound regions and lead terminal lead-out paths, the sealing of the battery material is maintained over a long term.

The buffer may be formed, for example, as a margin of the casing for sealing the battery element. The margin includes inner surfaces of the casing which directly oppose each other without intervention of the battery element, and are not joined to each other. The buffer need not be provided over the entire periphery of the battery element in an in-plane direction on the main surface of the battery element, but may be provided in at least a portion of the casing outside the battery element. Further, for preventing the casing from excessively deforming when the battery element is sealed, preferably the casing has a recess for receiving the battery element. In this event, the buffer is located adjacent to the recess. Also, the buffer may be positioned such that the region for accommodating the battery element is not above the buffer in a posture in which the film covered battery is installed for use, in order to prevent degraded performance of the battery element, which would be experienced when the electrolytic solution flows into the buffer so that a portion of battery element fails to contact with the electrolytic solution.

The present invention also provides a battery assembly which has a plurality of the foregoing film covered batteries stacked on one another. The battery assembly of the present invention has a plurality of the film covered batteries stacked in the thickness direction of the battery element, held in a pressurized state in a direction in which the film covered batteries are stacked, and installed in a posture in which the thickness direction of the battery element is oriented substantially in the horizontal direction, wherein the casing is not substantially provided with a region deformable by the pressure of a generated gas in a region at a level equal to or lower than the battery element when the laminate battery assembly is installed.

As described above, while the buffer is provided for accumulating a gas generated within the casing, the electrolytic solution sealed together with the battery element can flow into the buffer, simultaneously with the gas, depending on a positional relationship with the region for accommodating the battery element. To address this inconvenience, when the posture of the film covered battery has been specified in an actual use form, a portion of the casing which is deformable by the pressure of a generated gas is not provided in a region at a level equal to or lower than the battery element, whereby the electrolytic solution will not move downward even if a gas is generated. As a result, the battery element is prevented from degraded performance due to a failure in the contact of a portion of the battery element with the electrolytic solution.

In the designing of the battery assembly, the film covered batteries are preferably of the same type from a viewpoint of parts management. In this event, the buffer may be positioned above or below the battery element such that the film covered batteries can be used in common even when they are placed upside down. In such a case, preferably, the lower buffer may be fixed by a casing presser member for pressing the casing from the outside at a position corresponding to the buffer, or the lower buffer may be folded so that it is brought closer to the battery element, thereby limiting deformation of the casing in the lower buffer.

Also, a region of the casing deformable by a generated gas may be provided only above the battery element, such that a deformable region of the casing is avoided in a region at a level equal to or lower than the battery element.

The above and other objects, features and advantages of the present invention will become apparent from the following description with reference to the accompanying drawings which illustrate examples of the present invention.

DESCRIPTION OF THE PREFERRED EMBODIMENTS

Figure 2:
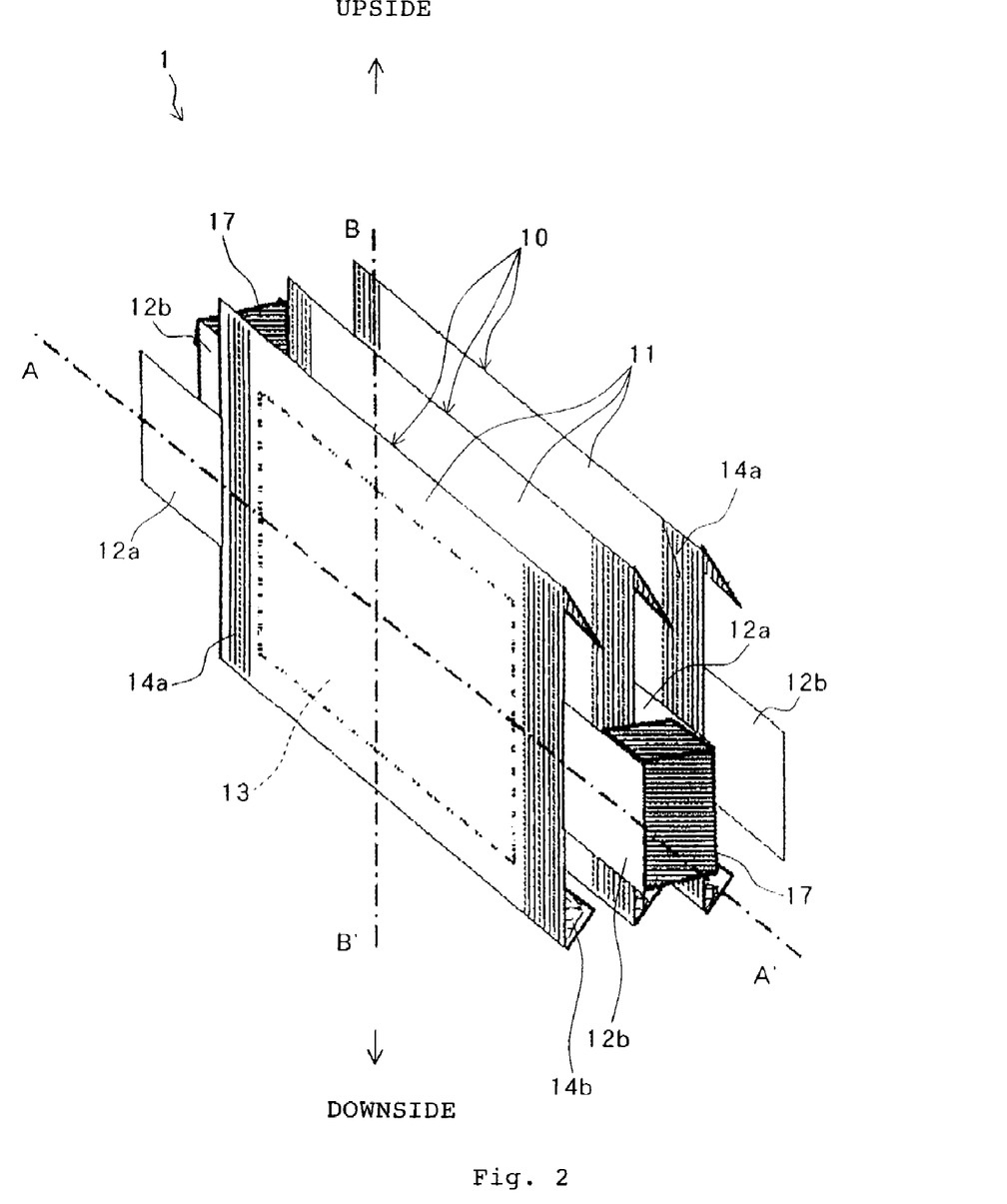
FIG. 2 is a perspective view of a stacked battery assembly according to one embodiment of the present invention.
Figure 3:
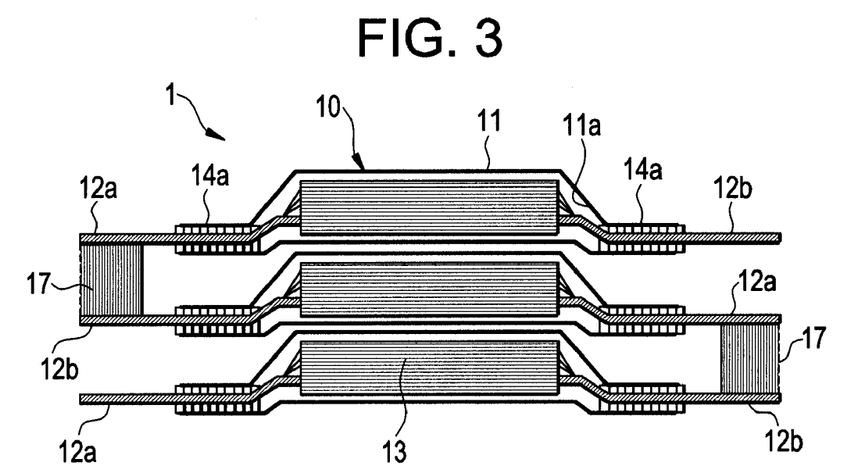
FIG. 3 is a cross-sectional view taken along line A-A' of the battery assembly illustrated in FIG. 2.
Figure 4:
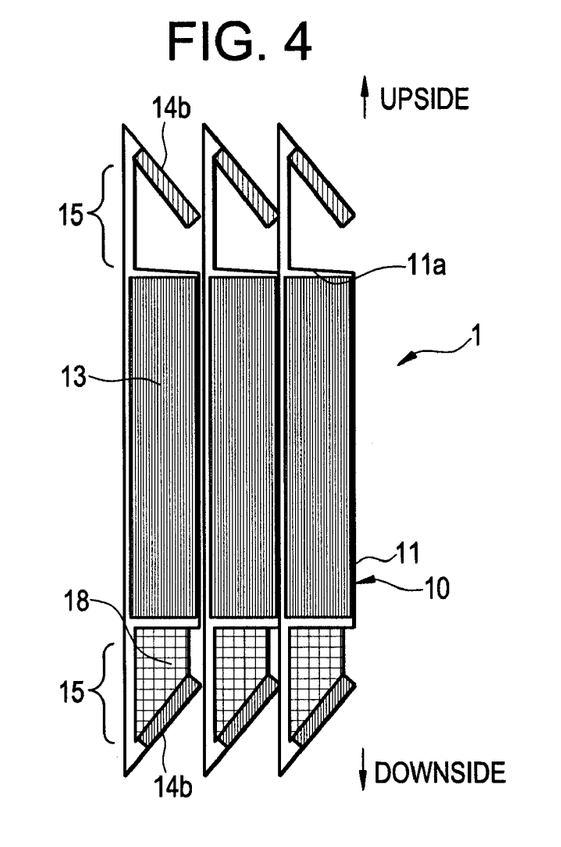
FIG. 4 is a cross-sectional view taken along line B-B' of the battery assembly illustrated in FIG. 2.

As illustrated in FIGS. 2 to 4, pilled battery assembly 1 according to one embodiment of the present invention comprises three cells, i.e., film covered batteries 10 which are stacked in the thickness direction thereof. Each film covered battery 10 comprises battery element 13; casing 11 for sealing battery element 13 together with an electrolytic solution; positive lead 12a and negative lead 12b electrically connected to battery element 13 and partially extended from casing 11 (hereinafter, positive lead terminal 12a and negative lead terminal 12b may be simply called the "lead terminal" in a collective sense).

Battery element 13 has positive electrodes and negative electrodes laminated generally in a flat shape with a separator being interposed between each positive electrode and each negative electrode, and is sealed within casing 11 together with an electrolytic solution. Positive lead terminal 12a is connected to a positive electrode, while negative lead terminal 12b is connected to a negative electrode. In this embodiment, positive lead terminal 12a and negative lead terminal 12b are led out from opposite sides of film covered battery 10.

Film covered batteries 10 are stacked in a direction in which the positive electrodes and negative electrodes are laminated in battery element 13, i.e., in the thickness direction of film covered batteries 10, and connected in series or in parallel with each other. Then, three film covered batteries 10 are simultaneously sandwiched with pressure by a pair of holder plates (not shown) from both sides in the direction in which film covered batteries 10 are stacked. In this embodiment, film covered batteries 10 are stacked such that positive lead terminals 12a and negative lead terminals 12b are alternately arranged in the direction in which film covered batteries 10 are stacked. Film covered batteries 10 are connected in series by electrically connecting adjacent positive lead terminal 12a and negative lead terminal 12b as appropriate through connection member 17.

Casing 11 may be made of a film comprised, for example, of a metal foil and a thermally sealable resin layer laminated on one side or both sides of the metal foil. Such casing 11 is used to wrap battery element 13, to which the lead terminals are connected, with the thermally sealable resin layer being arranged inside. Then, opposing internal surfaces of open casing 11 are thermally welded with each other around battery element 13 to seal battery element 13 with the lead terminals extending from casing 11.

Battery element 13 may be sealed by casing 11 by sandwiching battery element 13 with two casing members 11 on both sides in the thickness direction, and thermally welding four sides of casing members 11 around battery element 13, or by folding single casing member 11 into two to sandwich battery element 13 therebetween, and thermally welding three open sides of casing member 11. It should be noted that for thermally welding casing members 11, casing members 11 are thermally welded into a bag-like shape without one side of each casing member 11, the electrolytic solution is poured into the bag-shaped casing, and then the remaining sides are thermally welded to each other in a decompressed atmosphere. In this embodiment, two casing members 11 are used, wherein two sides from which the lead terminals extend have thermally sealing zone 14a, while the remaining two sides have thermally sealing zone 14b.

In this event, casing 11 has recess 11a previously formed, which serves as battery element room for receiving battery element 13 on one or both sides across battery element 13, such that casing 11 will not excessively deform to suffer from damages. Recess 11a can be formed, for example, through draw forming. The shape of the battery element room is substantially equal to the outer shape of battery element 13. Specifically, the battery element room has its surface area substantially equal to that of battery element 13, and has its depth substantially equal to the thickness of battery element 13. In this way, deformation of casing 11 can be minimized when battery element 13 is sealed. When casing 11 is made of a material which is flexible enough to withstand large deformation when battery element 13 is sealed, the film covered battery may be returned to the atmosphere after battery element 13 has been sealed in a depressed atmosphere, causing casing 11 to come into close contact with the surface of battery element 13 to result in deformation of casing 11. Since this sequence of operations substantially provides the battery element room, recess 11a is not necessarily formed for providing the battery element room.

Here, as illustrated in FIG. 4, casing 11 has margins 15, in which casing 11 is not at all processed, between the battery element room or recess 11a for receiving battery element 13 and thermally sealing zone 14b on the side from which no lead terminal is led out. In other words, margins 15 are portions which are not joined to each other through thermal welding or the like in regions of casing 11 across battery element 13, which directly oppose without intervention of battery element 13, or are portions in which is not formed even recess 11a in casing 11 which has recess 11a as in this embodiment. Margins 15a are formed continuously to the battery element room. Therefore, in margins 15, casing 11 can inflate in the thickness direction of battery element 13. While margins 15 are located above and below battery element 13, lower margin 15 is limited in inflation by casing holder member 18, as will be later described, so that it is upper margin 15 that actually inflates.

Figure 5:
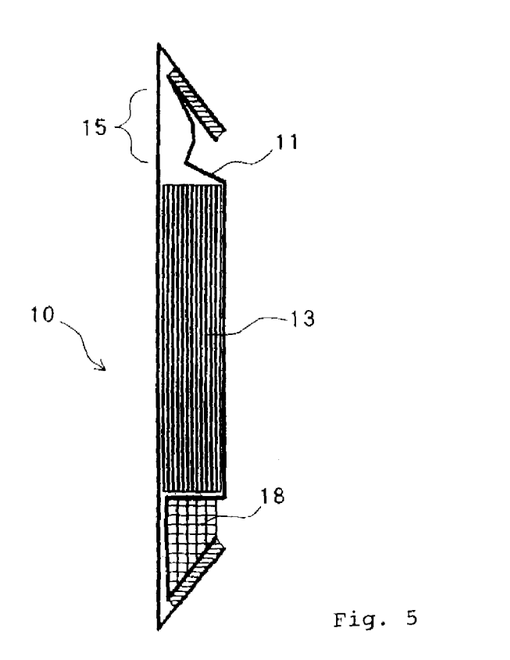
FIG. 5 is a cross-sectional view of a film covered battery when a gas is generated in the film covered battery in the battery assembly illustrated in FIG. 2.

By thus providing casing 11 with margins 15, a gas generated from battery element 13, if any, can move to margins 15. The gas moving to margins 15 is accumulated in margins 15, causing margin 15 to inflate, as illustrated in FIG. 5. With this process, even if a gas is generated from battery element 13, the increased internal pressure is limited in casing 11. As a result, since limited pealing forces act on thermally sealing zones 14a, 14b, it is possible to maintain the performance of casing 11 for sealing battery element 13, particularly, the performance of sealing for the lead terminal lead-out paths over a long term. Stated another way, margins 15 function as buffers for accumulating the gas generated from battery element 13.

The capacity of gas which can be held in margin 15 is determined based on the surface area of margin 15 in an in-plane direction on the main surface of battery element 13, and the thickness of battery element 13. Above all, the surface area of margin 15 depends on the distance from the battery element room of casing 11 to thermally sealing zone 14b. This distance is preferably set in a range of 3 to 15 mm. The distance less than 3 mm would not ensure a sufficient space for accumulating a generated gas. Conversely, the distance exceeding 15 mm would result in wasteful designing from a viewpoint of the volume efficiency of film covered battery 10. Consequently, the surface area of margin 15 is preferably minimized in consideration of an effective lifetime required for film covered battery 10, and the capacity of gas which can be generated during the lifetime.

Likewise, as to the position of margin 15, margin 15 may be provided at least at one position outside of battery element 13 in the in-plane direction on the main surface of battery element 13, as long as margin 15 can sufficiently hold a gas generated in film covered battery 10, such as at one position on the side along thermally sealing zone 14b, at least one position on the side from which the lead terminal is led out, or a combination thereof.

In this embodiment, positive lead terminal 12a and negative lead terminal 12b are led out from opposite sides of film covered battery 10, as can be seen in FIG. 2. By thus leading out the lead terminals, the lead terminals can have a wider side and therefore a lower resistance, so that resulting film covered battery 10 can support a large current.

However, in actual use of such film covered battery 10, when film covered batteries 10 are stacked to form stacked battery assembly 1, battery assembly 1 must be installed in some cases in such a posture in which the two sides, from which the lead terminals of film covered battery 10 are not led out, are oriented in the vertical direction, as illustrated in FIGS. 2 and 4, for convenience of routing of connection parts between film covered batteries 10, for convenience of the shape of a space required to mount battery assembly 1, and the like.

The term "install" used herein includes installing the battery assembly in a device in which the vertical direction is substantially consistent, such as mounting the battery assembly in a movable vehicle such as a vehicle, a motor bicycle, a bicycle, and the like, using the battery assembly in a fixed power supply for use with an uninterruptible power source, a distributed power storage system, and the like, and fixing the battery assembly on the ground or on a portion of a building such as a floor or a wall directly or through a housing, and does not include mounting the battery set in a portable device such as a wrist watch, a portable telephone, and the like in which the vertical direction is not consistent.

Figure 6:
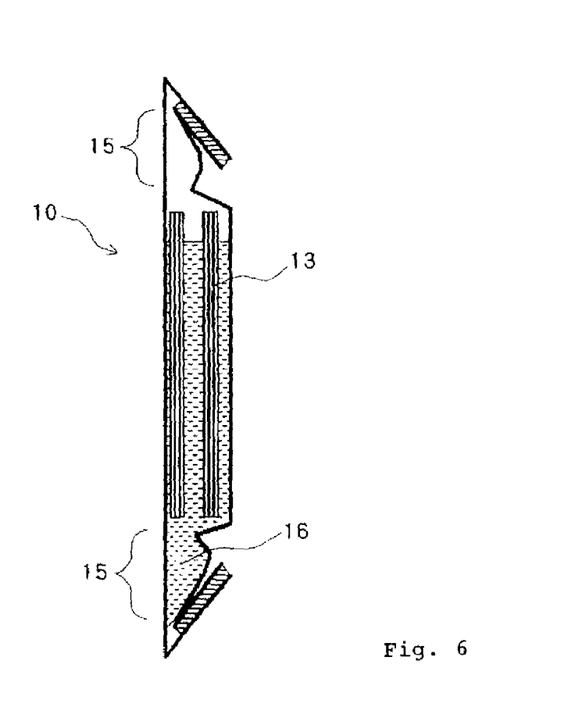
FIG. 6 is a cross-sectional view of the film covered battery which lacks a casing holder member in the state illustrated in FIG. 5.

When battery assembly 1 is installed in the orientation illustrated in FIGS. 2 and 4, i.e., in a posture in which the thickness direction of battery element 13 is oriented substantially in the horizontal direction, and the two sides of film covered battery 10, from which no lead terminal is led out, are oriented in the vertical direction, margins 15 are located above and below battery element 13. Since the internal pressure upon generation of a gas acts equally on the overall inner surface of casing 11, it is thought that the generation of a gas causes both margins 15 to inflate, as illustrated in FIG. 6. If lower margin 15 inflates, electrolytic solution 16 can flow into lower inflated margin 15 by the gravity. As a result, the level of electrolytic solution 16 lowers in film covered battery 10, so that a portion of battery element 13 is not immersed with electrolytic solution 16 and therefore does not contribute to charge/discharge, thereby reducing the capacity.

To solve this inconvenience, in this embodiment, casing presser member 18 is fixed at a position corresponding to lower margin 15 below battery element 13 for pressing casing 11 from the outside, as illustrated in FIG. 4, so that the inflation of lower margin 15 is constrained from the outside of casing 11. In this way, lower margin 15 is constrained by casing presser member 18, so that upper margin 15 alone inflates, as illustrated in FIG. 5, thereby limiting a downward movement of electrolytic solution 16. As a result, it is possible to eliminate any portion of battery element 13 which is not immersed with the electrolytic solution.

While casing presser member 18 is not particularly limited as long as it can suppress deformation of margin 15, materials suitably used for casing presser member 18 include a metal solid such as aluminum, copper, iron, stainless steel, and the like; a solid or elastic member made of a plastic material or a rubber material such as polyethylene, polypropylene, polyester, butyl rubber, ABS resin, SBR, NBR, and the like; an elastic material, a foam, a buffer, and the like such as steel wool, glass wool, urethane foam, silicone rubber foam, air bag, and the like; a cured body of a one-component or two-component curable adhesive, or a filler; and the like.

Also, while this embodiment has shown an example in which lower margin 15 is constrained by casing presser member 18 to prevent the level of the electrolytic solution from lowering, casing 11 itself may be processed such that casing 11 does not inflate below battery element 13. Several examples of this technique are illustrated in FIGS. 7 and 8.

Figure 7:
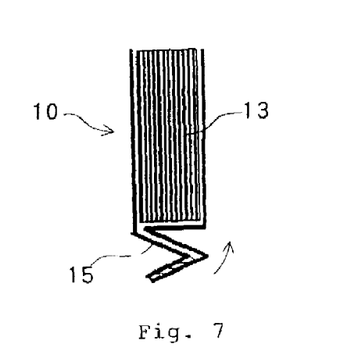
FIG. 7 is a cross-sectional view illustrating a lower portion of a film covered battery which has a folded lower margin.

In an example illustrated in FIG. 7, lower margin 15 is folded so that it is brought closer to battery element 13, making lower margin 15 substantially incapable of inflating or deforming to prevent the electrolytic solution from flowing into lower margin 15. In this structure, margin 15 is preferably held in the folded state with an adhesive or the like for preventing folded margin 15 from unfolding into the original shape due to an increasing internal pressure in film covered battery 10.

Figure 8A:
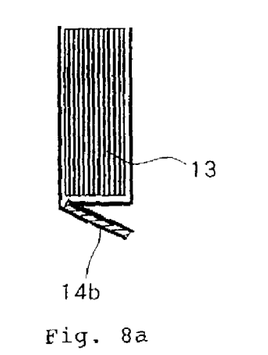
FIGS. 8a and 8b are cross-sectional views of several exemplary film covered batteries which are not provided with a lower margin.

In an example illustrated in FIG. 8a, lower thermally sealable portion 14b is provided near battery element 13 to eliminate a margin below battery element 13, thereby preventing the electrolytic solution from moving down below battery element 13. In an example illustrated in FIG. 8b, the lower end of battery element 13 is abutted to casing 11 and wrapped up by casing 11 to eliminate a margin below battery element 13, thereby preventing the electrolytic solution from moving down below battery element 13.

In the manners described above, by substantially eliminating any region of casing 11 which can inflate or deform due to the pressure of a gas generated from battery element 13 in a region below battery element 13 in a posture in which film covered battery 10 is installed, it is possible to prevent the level of the electrolytic solution from lowering due to the generation of the gas within film covered battery 10 to prevent a lower capacity of film covered battery 10.

Figure 8B:
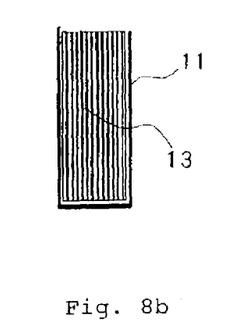

In the examples illustrated in FIGS. 8a and 8b, no margin is provided below battery element 13, so that for the configuration of battery assembly 1 arranged as illustrated in FIG. 2 using film covered batteries 10 having the foregoing structure, it is necessary to manufacture two types of film covered batteries 10 which differ in the position of the margin, when taken into consideration the surface/back and up/down orientations of film covered batteries 10, and the orientation of polarities of lead terminals. The manufacturing of two types of film covered batteries 10 simply different in the position of the margin may be inconvenient in regard to manufacturing management, because two types of manufacturing lines are required for film covered batteries 10 themselves, and because the two types of film covered batteries 10 must be managed on the manufacturing line of battery assembly 1.

Thus, the film covered battery alone is designed to eliminate the up/down relation as in the structures illustrated in FIGS. 4 and 7, and when assembled into battery assembly 1, casing presser member 18 is attached, lower margin 15 is folded, and the like to prevent the electrolytic solution from moving down below battery element 13. As a result, only one type of film covered battery 10 need be manufactured, thereby avoiding the aforementioned inconvenience.

Figure 9:
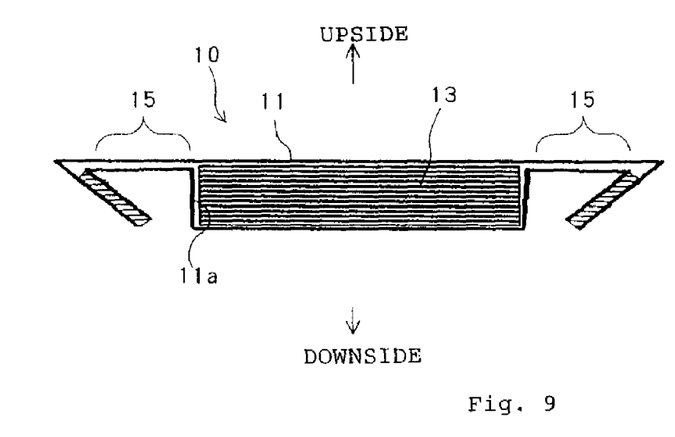
FIG. 9 is a cross-sectional view of a film covered battery which is mounted along a substantially horizontal surface.

When film covered battery 10 is installed along a substantially horizontal surface, film covered battery 10 may be formed using casing 11 which has recess 11a serving as the battery element room only on one of two halves which sandwich battery element 13, as illustrated in FIG. 9. Film covered battery 10 may be installed with the casing half having recess 11a and being placed below, so that the battery element room is not positioned above margin 15. Thus, even if margins 15 are provided on both sides of battery element 13, no electrolytic solution will flow into margins 15. Moreover, in this case, margin 15 may be provided over the entire periphery of battery element 13 in an in-plane direction perpendicular to the thickness direction of battery element 13.

While description has been made above of representative embodiments of the present invention, supplementary description will be given below to the respective components of the film covered battery.

(Lead Terminals)

Materials suitable for the lead terminals may include Al, Cu, Ni, Ti, Fe, phosphor copper, brass, stainless steel, and the like, which may be annealed as required. The lead terminals preferably have a thickness in a range of 0.08 to 1.0 mm.

Also, at least a portion of the lead terminal in close contact with the casing is preferably surface treated in order to improve the adherence with the casing. This type of surface treatment may include, by way of example, a surface roughening treatment by chemical etching, a corrosion-resistant coating foundation treatment with a coating made up of partially aminated phenol-based polymer, phosphorus compound, and titanium compound, phosphorus zinc-based coating, and the like, a surface treatment using a titanium-based coupling agent, an aluminate-based coupling agent, and the like, and so forth.

The lead terminal is preferably previously welded with a resin film including a metal adhesive resin. Materials suitable for the metal adhesive resin may be those which adhere to the surface of the lead terminal which is a metal plate, for example, acid denatured polypropylene, acid denatured polyethylene, acid denatured poly(ethylene-propylene) copolymer, ionomer, and the like.

(Casing)

While the casing is not particularly limited as long as it is flexible enough to cover the battery element such that the electrolytic solution does not leak, a laminate film comprised of a metal film and a thermally sealable resin layer laminated on the metal film is particularly preferably used for the casing. This type of laminate film for use as the casing may be comprised of a metal foil of 10 µm to 100 µm thick and a thermally sealable resin of 3 µm to 200 µm thick adhered to the metal foil. Materials suitably used for the metal foil may include Al, Ti, Ti-based alloy, Fe, stainless steel, Mg-based alloy, and the like. Materials suitably used for the thermally sealable resin may include polypropylene, polyethylene, acid denatured polypropylene and polyethylene, polyphenylene sulfide, polyester such as polyethylene terephthalate, polyamide, ethylene-vinyl acetate copolymer, and the like.

(Battery Element)

The battery element may be of a laminate type or a wound type as long as the positive electrodes and negative electrodes are alternately laminated through separators. The laminate-type battery element comprises a plurality of positive electrodes and negative electrodes alternately laminated with a separator interposed between each positive electrode and each negative electrode, charge collectors made by integrating tabs (protrusions not coated with an electrode material) extending from the respective positive electrodes and negative electrodes, respectively, and lead terminals connected to the respective charge collectors. The wound-type battery element comprises a positive electrode, a negative electrode, and a separator formed in a strip shape, which are laminated, wound up, and compressed into a flat shape, and tabs extending from the positive electrode and negative electrode, respectively, and connected to respective lead terminals.

The positive electrode is not particularly limited as long as it absorbs positive ions or emits negative ions upon discharge, and conventionally known materials for the positive electrode of a secondary battery may be used therefor, such as (i) metal oxides such as $LiMnO_2$, $LiMn_2O_4$, $LiCoO_2$, $LiNiO_2$, and the like; (ii) conductive polymers such as polyacetylene, polyaniline, and the like, (iii) disulfide compounds represented by a general formula (R-Sm)n (where R is an aliphatic series or an aromatic series, S is sulfur, and m, n are integers which satisfy $m \geq 1$, $n \geq 1$) (dithioglycol, 2,5-dimercapt-1,3,4-diaziazol, S-triazine-2,4,6-trithiol, and the like). Also, the positive electrode can be formed by mixing a positive electrode active material (not shown) with a proper binding agent and a functional material. The binding agent may be halogen containing polymer such as polyvinylidene fluoride and the like, while the functional material may be acetylene black for ensuring the electron conductivity, conductive polymers such as polypyrole, polyaniline, and the like, polymer electrolyte for ensuring ion conductivity, complexes thereof, and the like.

The negative electrode is not particularly limited as long as it is made of a material which can occlude and emit cations, and conventionally known negative electrode active materials for a secondary battery can be used, including crystalline carbon such as graphitized carbon produced by thermally treating natural graphite, coal/petroleum pitches, and the like at high temperatures, non-crystalline carbon produced by thermally treating coal, petroleum pitch coke, acetylene pitch coke, and the like, metallic lithium, lithium alloy such as AlLi, and the like.

The electrolytic solution impregnated into the battery element may be made by dissolving a salt comprised of cation of an alkali metal such as Li, K, Na, and the like, and anion of a compound including halogen such as $ClO_4-$, $BF_4-$, $PF_6-$, $CF_3SO_3-$, $(CF_3SO_2)_2N-$, $(C_2F_5SO_2)_2N-$, $(CF_3SO_2)_3C-$, $(C_2F_5SO_2)_3C-$, and the like into a basic solvent with high polarity which can be used as an electrolytic solution for a secondary battery, such as ethylene carbonate, propylene carbonate, dimethyl carbonate, diethyle carbonate, methyl ethyl carbonate, γ-butyrolactone, N,N'-dimethyl formamide, dimethyl sulfoxide, N-methylpyrrolidone, m-cresol, and the like. Also, solvents comprised of these basic solvents and electrolytic salts may be used alone, or a plurality of them may be combined for use as an electrolytic solution. Alternatively, the electrolytic solution may be a gel electrolytic solution which is polymer gel including an electrolytic solution. In addition, a trace of sulfolane, dioxane, dioxolane, 1,3-propane sultone, tetrahydrofuran, vinylene carbonate may be added to the electrolytic solution.

While the foregoing materials are used for a lithium ion secondary battery, the present invention can be applied to a lead battery, a nickel cadmium battery, and a nickel hydrogen battery as well. The present invention can also be applied to an electric double layer condenser, nonaqueous condenser, and the like, as well as to batteries.

Although a certain preferred embodiments of the present invention have been shown and described in detail, it should be understood that various changes and modifications may be made without departing from the spirit or scope of the appended claims.

What is claimed is:

1. A film covered battery comprising:
   a battery element to which lead terminals are connected; and
   a flexible casing,
   wherein said battery element is wrapped by said casing, and inner surfaces of said casing that face each other are heat sealed around said battery element so that said battery element is sealed along with an electrolytic solution and said lead terminals are extended from said casing,
   wherein a buffer for accumulating gas generated within said casing due to deformation of said casing is formed at some portions outside said battery element with respect to in-plane direction on main surface of said battery element, and said buffer is formed along the complete length of at least one side that extends along the heat sealed inner surfaces of said casing, and said buffer is formed continuously with a region accommodating said battery, by forming said heat sealed inner surfaces away from said region that accommodates said battery.

* * * * *